Figure 1:
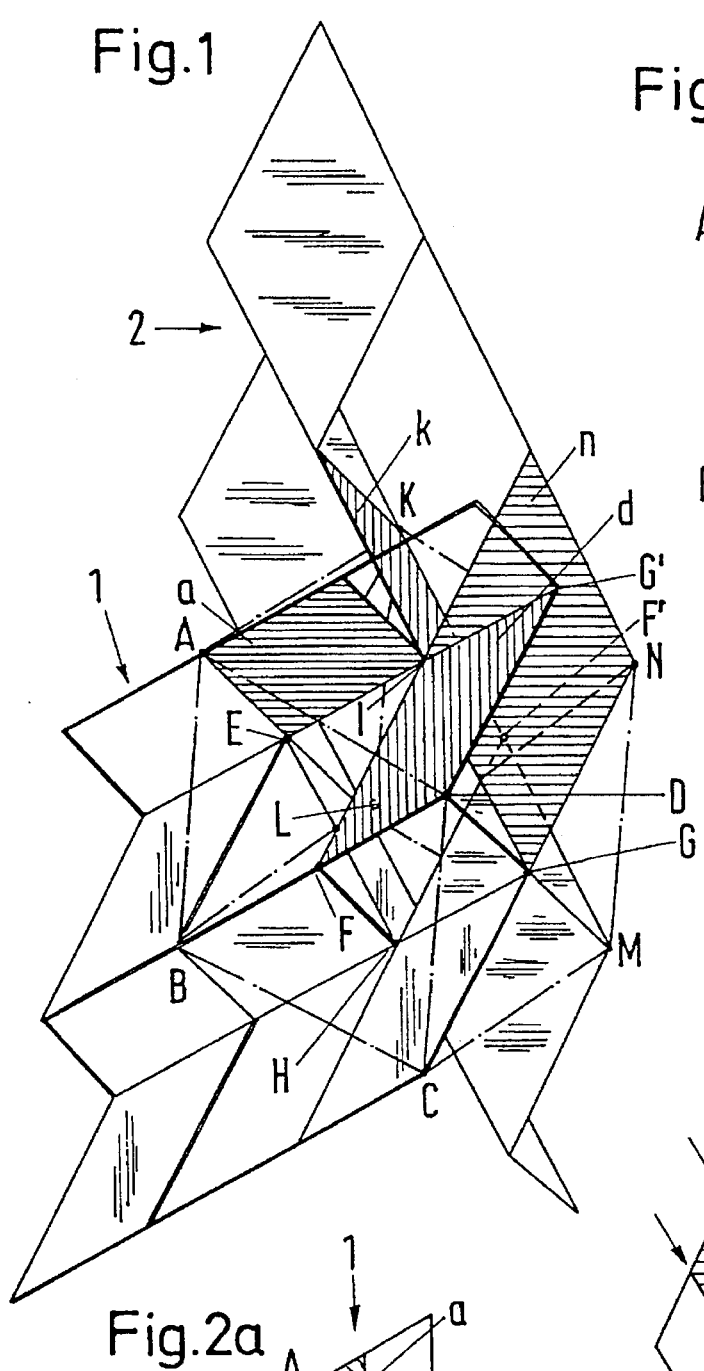

United States Patent [19]

Süess et al.

[11] Patent Number: 5,629,258
[45] Date of Patent: May 13, 1997

[54] FLAT STRUCTURAL ELEMENTS AND A PACKING COMPOSED OF SUCH STRUCTURAL ELEMENTS

[75] Inventors: Philipp Süess, Neftenbach; Raymond Plüss, Kleinandelfingen, both of Switzerland

[73] Assignee: Sulzer Chemtech AG, Winterthur, Switzerland

[21] Appl. No.: 383,140

[22] Filed: Feb. 3, 1995

[30] Foreign Application Priority Data

Mar. 9, 1994 [EP] European Pat. Off. ............ 94810149

[51] Int. Cl.⁶ .................... B01J 19/32; B01J 35/04; B01F 5/06; F28F 25/08
[52] U.S. Cl. .................... 502/439; 202/266; 95/210; 95/213; 261/114.5; 261/112.2; 261/113; 261/DIG. 72
[58] Field of Search .................... 202/266; 95/210, 95/213; 261/DIG. 72, 114.5, 113, 112.2; 502/439, 527; 428/108, 175

[56] References Cited

FOREIGN PATENT DOCUMENTS

| 2.086.365 | 12/1971 | France . |
|---|---|---|
| 2032293 | 4/1971 | Germany . |
| 2032292 | 4/1971 | Germany . |
| WO/90/10497 | 9/1990 | WIPO . |

*Primary Examiner*—Glenn A. Caldarola
*Assistant Examiner*—Behir L. Yildirim
*Attorney, Agent, or Firm*—Townsend and Townsend and Crew L.L.P.

[57] ABSTRACT

A flat structural element has a plurality of openings which are distributed according to a predetermined pattern for use in packings. Every opening is delimited by the edges, which extend at an angle to each other or are curved. The structural element is made from two or more adjacent strips of flat material which are connected to each other with butt or overlapping connections.

24 Claims, 6 Drawing Sheets

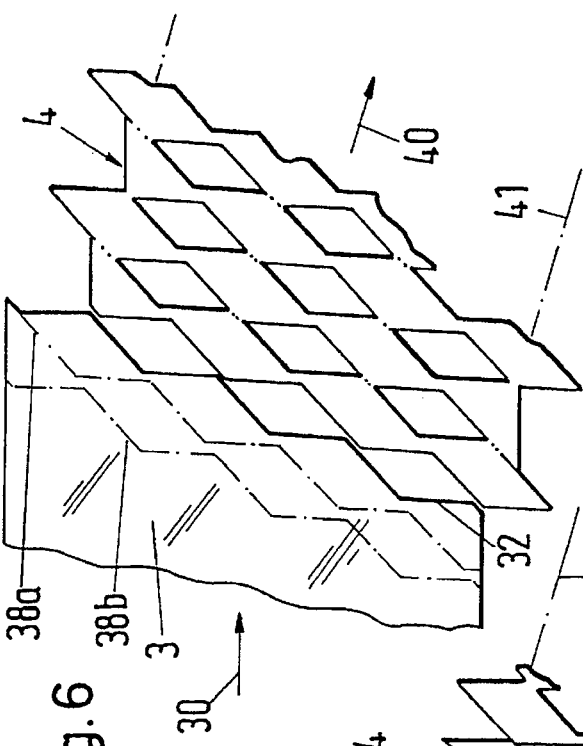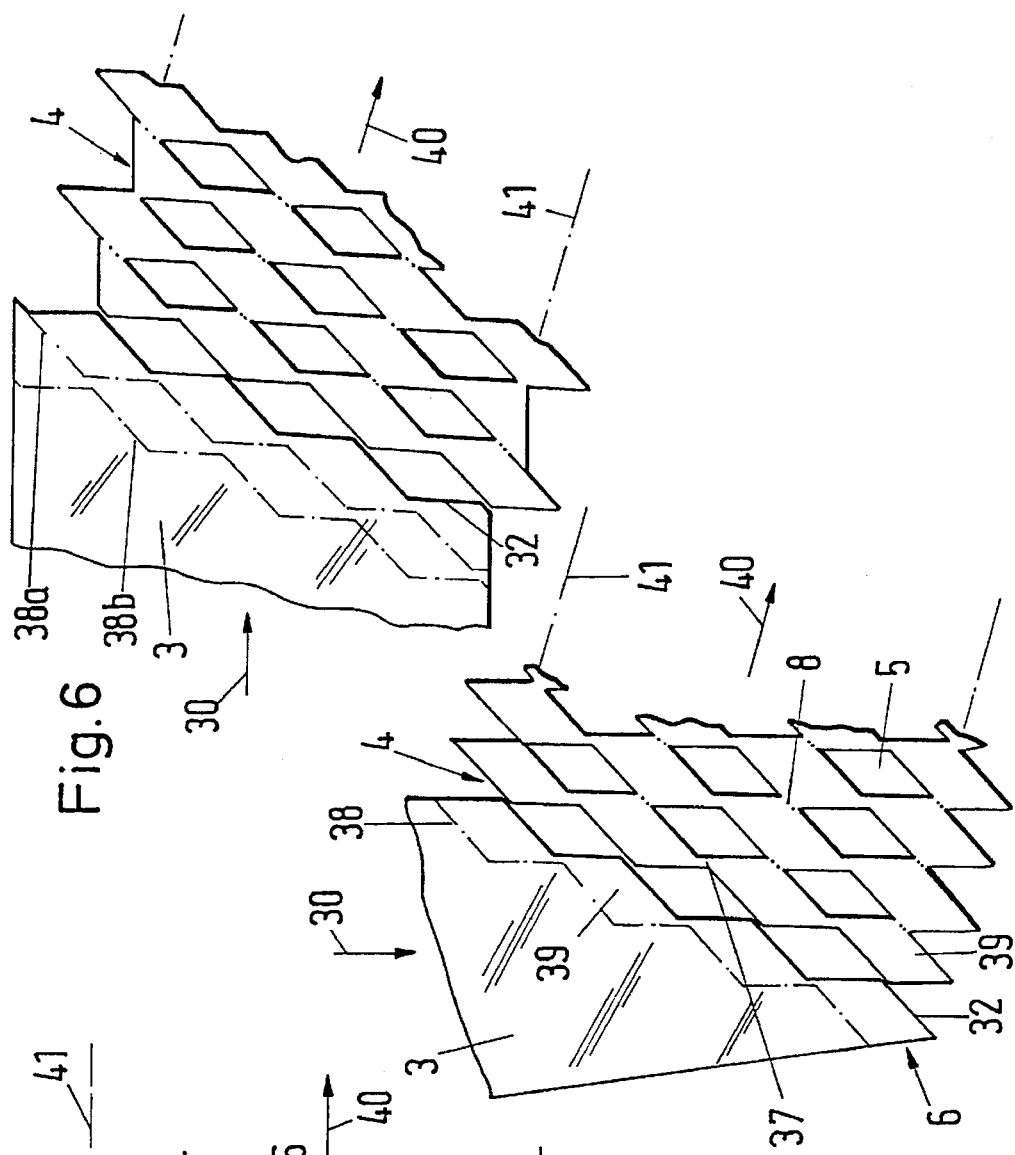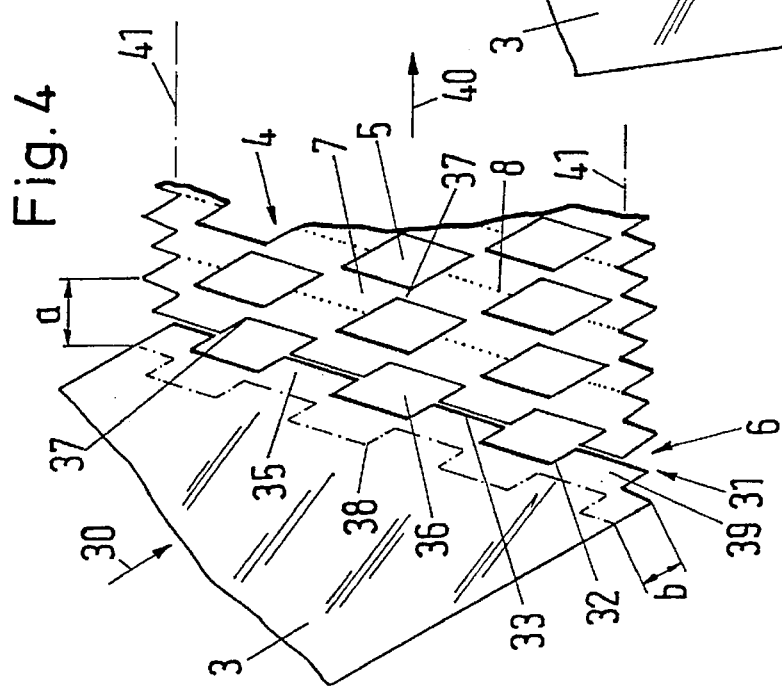

FLAT STRUCTURAL ELEMENTS AND A PACKING COMPOSED OF SUCH STRUCTURAL ELEMENTS

The invention relates to flat structural elements having a plurality of openings distributed according a predetermined pattern and a packing composed of such structural elements.

From WO 90/10497 is known a vortex packing (multiple vortex mixing insert) which may be built up of layers of zigzag-folded metal sheets, the so-called pleated mats. The layers are parallel to an axis, the apparatus axis, while the folding edges are inclined to this axis. The layers are alternately so arranged that a system of channels is produced which often cross each other. The unfolded metal sheets have a chessboard-like pattern of substantially rhombic fields one half of which has the form of apertures. The other half forms structural elements of the packing. The open fields are somewhat smaller so that they have the form of island-like openings, and the closed fields are connected to each other at vertices by linear overlappings. The open fields form in the packing a second system of channels which often cross each other, the second system extending transversely to the first system. The folding edges extend—in the direction of the overlappings—along one part of the field margins.

In the known packing the apertures in the metal sheets in the layers are made by stamping-out processes. It is mainly disadvantageous that nearly half of the starting material is lost and in addition, due to the expense involved with the stamping tools, there are limitations on the shape of the openings desirable as regards the method.

The aim of the invention is to devise flat structural elements of all possible shapes adaptable optimally to the particular requirements of the method which result in the smallest possible loss of material and enable production of layered packing from these flat structural elements, particularly packings which may be used in a most versatile manner.

This aim is achieved according to the invention by the features of claim 1.

It is particularly important that, due to the intermediate step of formation of individual strips of flat material and their interconnection according to a defined relative displacement, not only loss of material is widely avoided but it is at the same time achieved that by the choice of special extension of cutting lines is obtained a considerable freedom as regards the position, size, shape and distribution of the openings in the flat structural elements. By suitable folding and corresponding choice of the extension of folding edges three-dimensional flat structures may be created from these flat structural elements, which are advantageously suitable for the formation of layered systems, particularly formation of packings and especially for the formation of vortex packings.

Particularly advantageous forms of the flat structural elements according to the invention and also their use in packings are referred to in the subsidiary claims.

Figure 3:
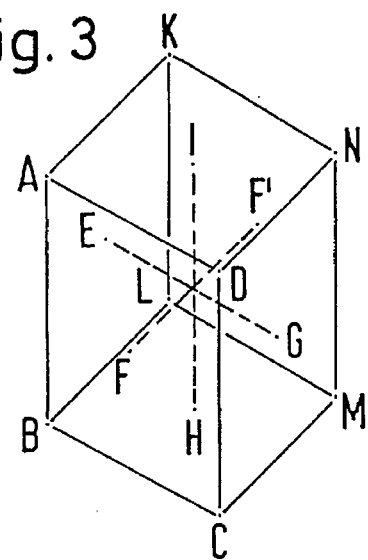
Figure 2A:
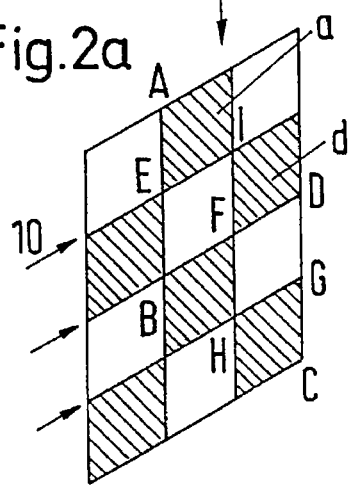
Figure 2B:
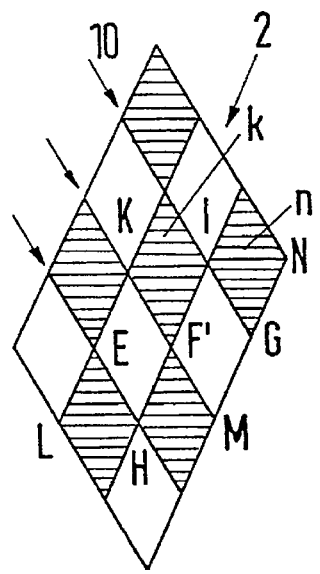
Figure 7:
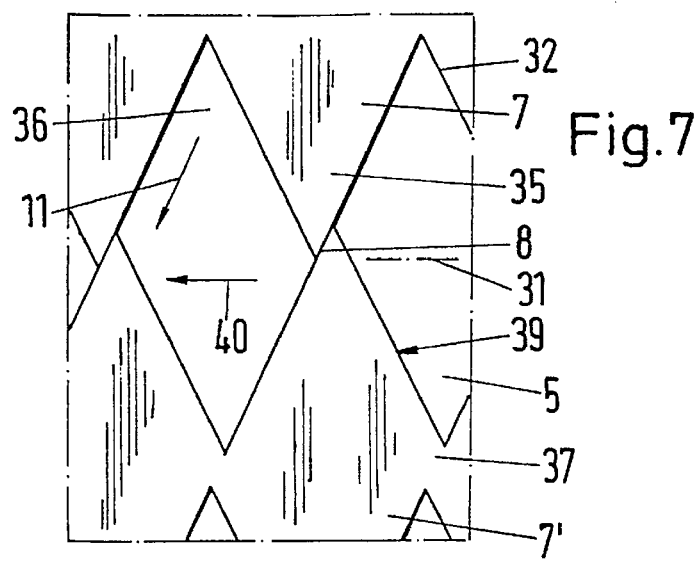
Figure 8:
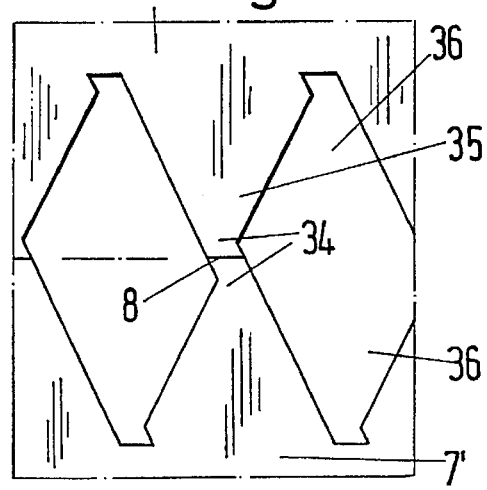
Figure 9:
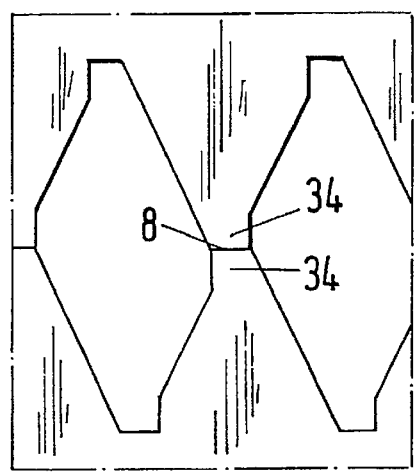
Figure 10:
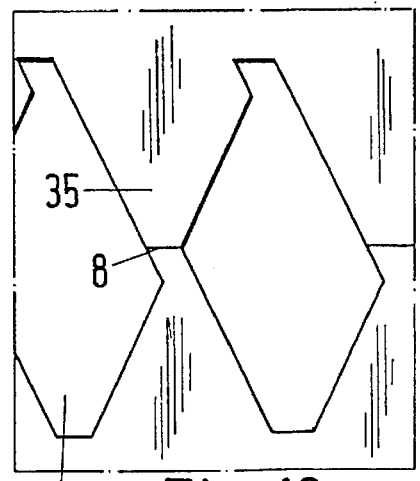
Figure 11:
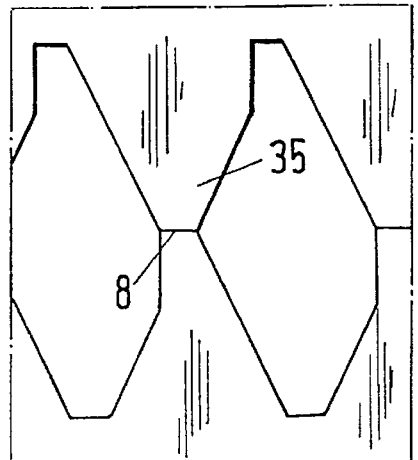
Figure 12:
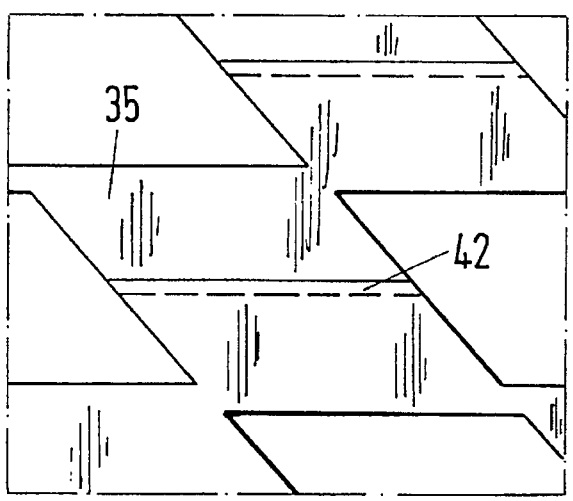
Figure 13:
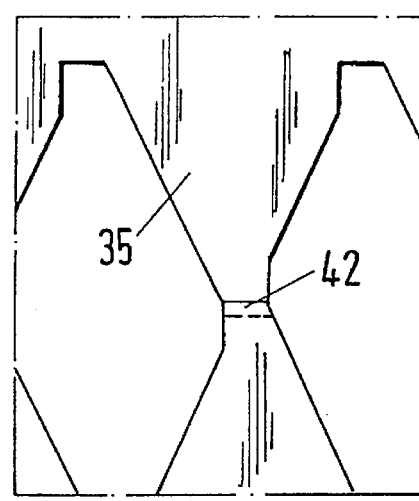
Figure 14:
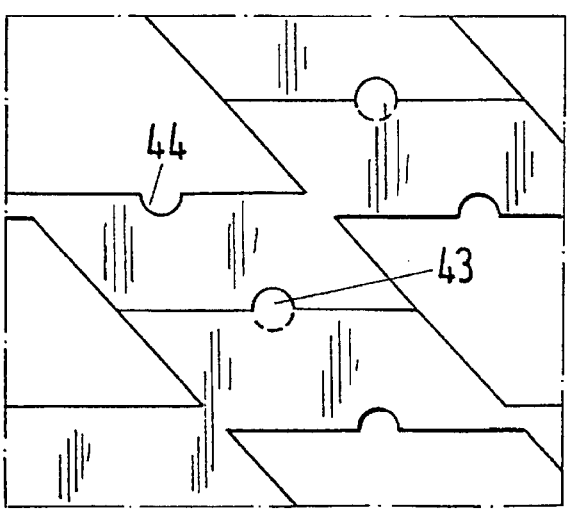
Figure 15:
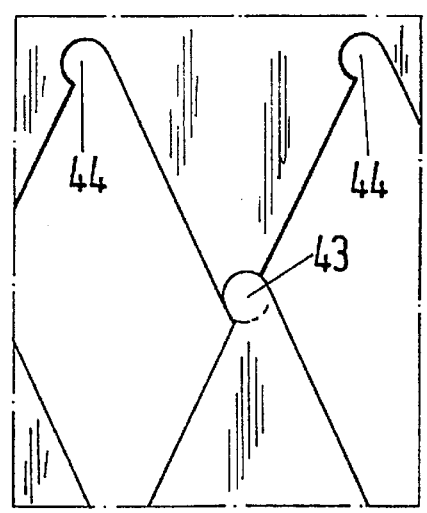
Figure 16:
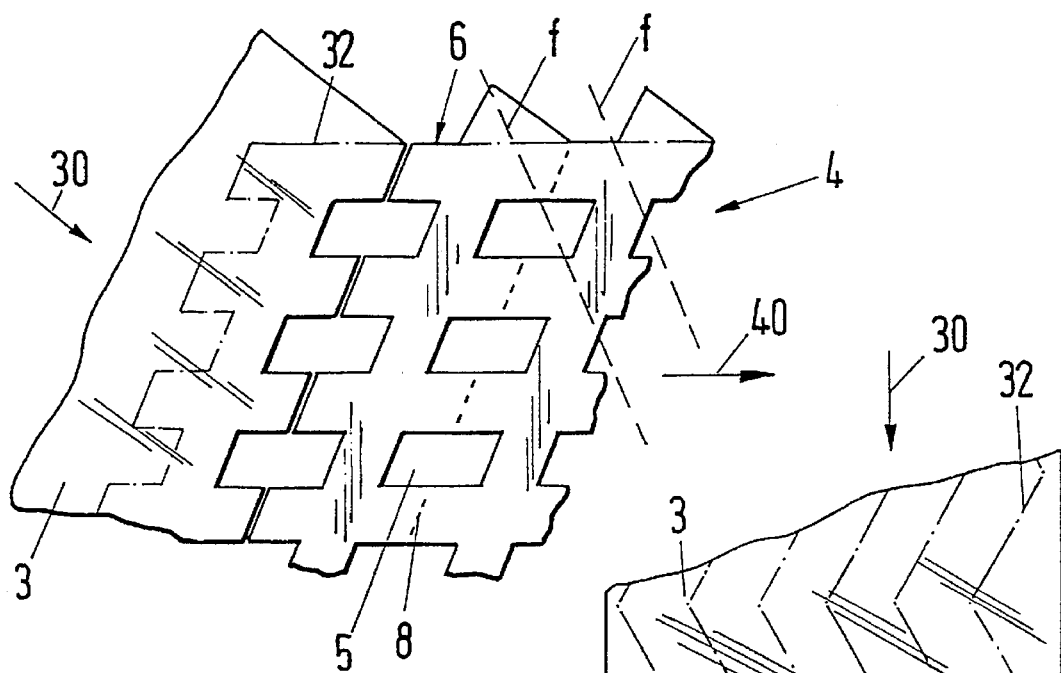
Figure 17:
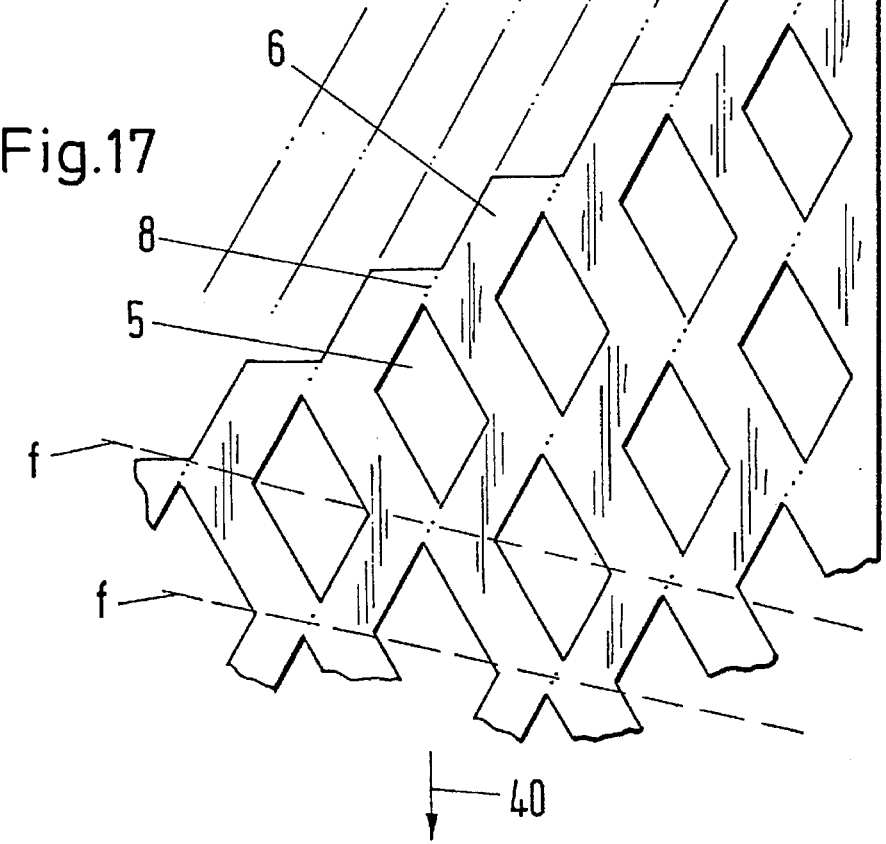
Figure 18:
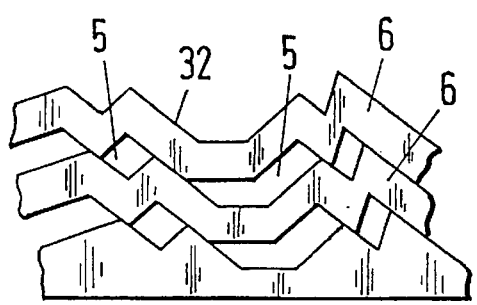
Figure 19:
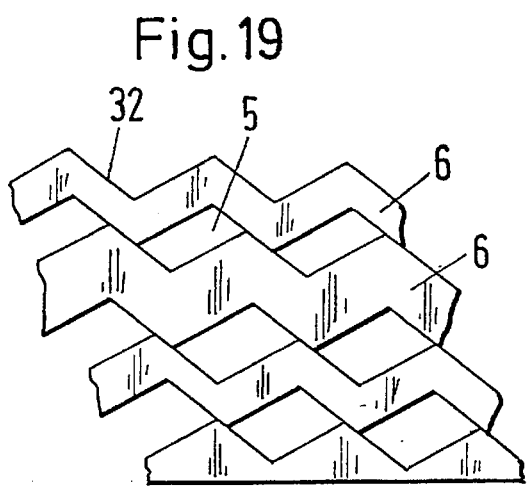
Figure 20:
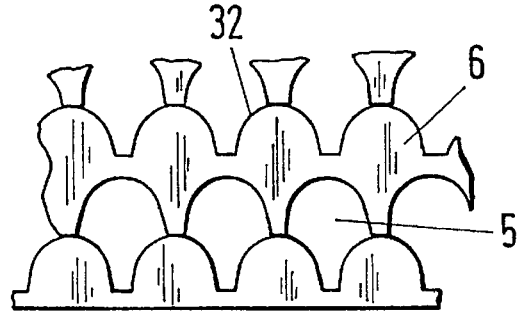
Figure 21:
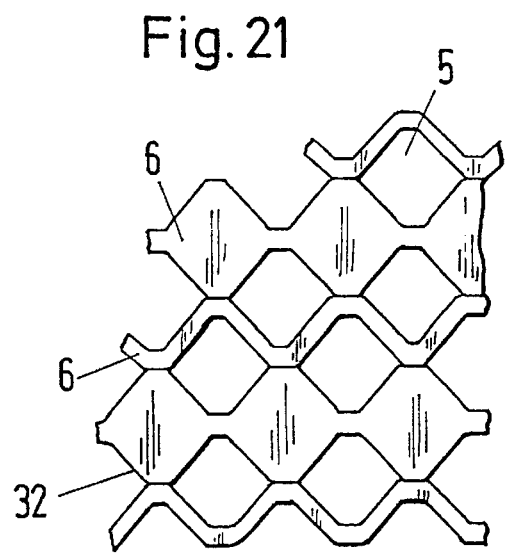
Figure 22:
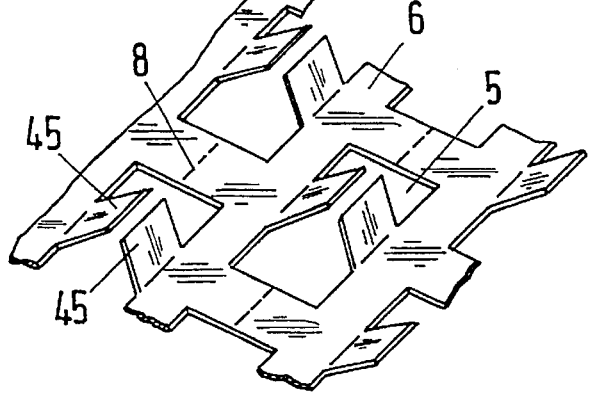
Figure 23:
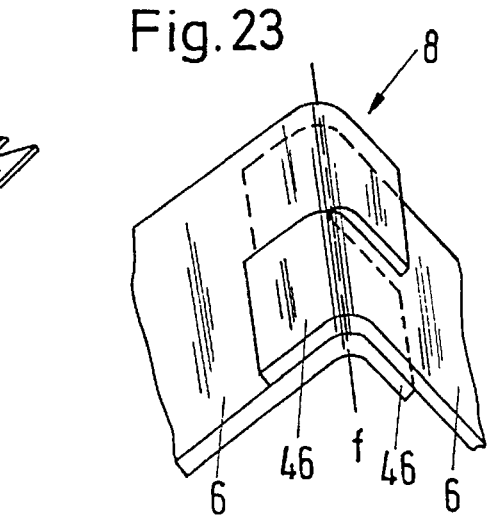

The invention will now be explained, by way of example, with the help of embodiments, with reference to the drawings. In the drawings:

FIG. 1 is a section of a known vortex packing (ideal case),

FIGS. 2a, 2b show two areas with rhombic fields which, after zigzag folding, result in the structure of FIG. 1, FIG. 3 shows an elementary cell of a point lattice, FIG. 4 shows production of a foil with apertures according to the invention in which the teeth of the cut edge are rhombic, FIG. 5 shows a further production and a first example with a zigzag-shaped cut edge and teeth, which make an angle of 120°, FIG. 6 shows a further production and a second example with a zigzag-shaped cut edge and teeth, which make an angle of 120°, FIG. 7 shows a zigzag-shaped cut edge and teeth, which make an angle of 60°, FIGS. 8–11 show variant forms of the cut edge shown in FIG. 7, FIG. 12 shows a strip-shaped overlapping of the connection places for the embodiment shown in FIG. 4, FIG. 13 shows a strip-shaped overlapping of the connection places for the embodiment shown in FIG. 9, FIG. 14 shows overlapping of the connection places in the form of a small circular area for the embodiment shown in FIG. 4, FIG. 15 shows overlapping of the connection places for the embodiment shown in FIG. 7, FIG. 16 shows a diagrammatic representation for the explanation of a further example of production of a flat structural element according to the invention, in which the openings are rectangular, FIG. 17 shows a representation for the explanation of a further variant for the production of a flat structural element according to the invention, FIG. 18 shows a section of a representation of a variant of a flat structural element with varying openings, FIG. 19 shows a partial representation of a flat structural element of different strips of flat material, FIG. 20 shows a diagrammatic partial representation of a flat structural element with openings delimited by curved edges, FIG. 21 shows a further diagrammatic partial representation of a flat structural element of two different kinds of strips of flat material, FIG. 22 shows a diagrammatic partial representation of a flat structural element with partly 3-dimensionally deformed partial regions, and FIG. 23 shows a diagrammatic partial representation of a fold-clamp connection between two strips of flat material.

The basic construction of a vortex packing (multiple vortex mixing insert) composed of flat structural elements will be explained with the help of FIGS. 1 to 3.

The illustrated vortex packing is an ordered packing having a fan-like arrangement of guiding surfaces, which deflect the flow media from their direction of main flow to all sides and mix together adjacent partial streams. The guiding surfaces are the structural elements of the packing. To the lattice planes, which are situated perpendicularly to the axis of the apparatus, correspond two different layers of octahedra. In one of the layers the octahedron faces are alternately open and closed, while in the other layer all the octahedra have open faces. The layers are interlinked such that the octahedra of adjacent layers of the same kind meet at their polar vertices. The octahedra fill out only two thirds of the space; the spaces between them are formed by tetrahedra. The vertex packing is composed of face-shaped structural elements. These structural elements define a point lattice whose lattice planes, which extend perpendicularly to the apparatus axis, form a base grid of quadrilaterals. The quadrilaterals represent always an equatorial periphery of an octahedron and the polar vertices of these octahedra lie on the points of the adjacent lattice planes.

In the special case where the structural elements are rhombuses with an acute angle of 60°, the point lattice associated with the vertex packing is a face-centred cubic lattice. This is shown in FIG. 1; the unit cell of the lattice is the cube with vertices A, B, C, D, K, L, M and N and with face centres E, F, G, H, I and F' (see also FIG. 3 with a cube stretched in the direction A-B. The shown section of the packing is composed of two zigzag folded faces 1 and 2 provided with rhombic apertures, which are shown in their unfolded state in FIGS. 2a and 2b. The hatched faces (e.g. a and d) are the closed faces; the remaining faces represent the apertures. The arrows 10 indicate the direction and position of the folding edges. In order to make the structure shown in FIG. 1 in practice, it is necessary—as already mentioned—to connect the closed rhombic faces at their corners by linear overlappings (see FIG. 4 of WO 90/10497. Here the connection between the structural elements is shown, for simplicity, as a connection at points.

In FIG. 1 the faces a, d, n and k are particularly emphasized by hatching: They form a fan-like arrangement of guiding surfaces (direction of main flow is H-I). The octahedron delimited by face centres E, . . . F' is a regular octahedron of the kind having all faces open. Between the two faces d and n is situated an octahedron (only a half of which is shown) of the other kind (alternately open and closed faces); the vertices of this half are I, D, G, N and G'.

The drawings, with reference to which the structures according to the invention will now be described, show the face-centred cubic special case. But also the generalization is valid that the unit cell A, . . . N is not cubic but is a parallelepiped, for instance a cuboid, as is shown in FIG. 3 (the edge AB is longer than the edges BC and AK).

The structure shown in FIG. 1 represents the ideal case in which the guiding surfaces a, d, k and n meet exactly at a point I. If the two faces 1 and 2 are displaced with respect to each other (i.e. in the direction of the layers (i.e. in the direction of the plane which is defined e.g. by points A, B and C), there is, in general, a deviation from the ideal case. Even in the case of such a deviation the advantages of the vortex packing are to a certain degree preserved. This applies also when the faces 1 and 2 are arbitrarily arranged next to each other. The invention encompasses also these cases in which the ideal case is not present.

FIG. 4 shows how a flat structural element 4 with rhombic openings 5 according to the invention may be made from a sheet-like or foil-like starting material 3.

The arrows 40 and 30 indicate the advance of the flat starting material 3 and the strips 6 of flat material formed by cuts, which takes place in steps by step lengths a or b.

On the cut front 31 meet the starting material 3 and a strip 6 of flat material separated by a cut. The cutting line 32 extends such that a tooth-shaped pattern with rhombic teeth 35 and gaps 36 is formed. On the mutually opposite end faces 33 of the teeth 35 is made a connection, e.g. by welding.

The cutting line produced in the next working step is shown by a dash-dotted line at 38, i.e. the produced strip 6 of flat material is delimited by the cutting lines 32 and 38 and consists of a row of rhombuses 39 connected to each other at the vertices. The connection bridges are alternately at the vertices with the obtuse or acute angles of the rhombuses 39.

The flat structural element 4, obtained by the cuts, the displacement and the connection of the strips 6 of flat material, contains closed partial face elements 7 and openings 5. It is at the lateral margins serrated, but the serrations may be cut off along the marginal lines 41. It may, however, be advantageous to leave the serrations on one side an use them in a packing made up of such flat structural elements in a mass exchange column as drip-off elements.

The connecting seams 8 between the individual strips 6 of flat material may be made e.g. by welding or soldering and produced fully automatically.

In the embodiment according to FIG. 5 the cutting line 32 (or 38) is zigzag-shaped. The individual sections or parts of this zigzag-shaped cutting line are of identical length and make an angle of 120°. It should be mentioned that this angle may also be of a different size, but should preferably lie in the range between 110° to 150°. The strip 6 of flat material situated between the cutting lines 32 and 38 has again the shape of a chain of rhombuses 39, which are connected to each other at vertices. The connection bridges 37 are in this case situated always at the acute angles. Connection seams 8, produced e.g. by welding or soldering, produce from the strips 6 of flat material the desired flat structural element 4 with the openings 5.

FIG. 6 explains the variant of the manufacturing method according to FIG. 5 which produces substantially the same flat structural element 4, while, however, the advance direction 30 of the starting material 3 is turned through 90° with the same advance direction 40 of the flat structural element 4.

The difference is obtained in that a cutting line 38a and a cutting line 38b are produced alternately and are displaced with respect to each other by half a tooth length in the direction of the cut front 31. The cutting line 32 corresponds to the cutting line 38b.

FIG. 7 shows an embodiment of the invention in which the cutting line 32 is formed using a zigzag-shaped line with the teeth 35 and gaps 36. The individual line segments are of equal length and subtend always an angle of 60°. This angle may, however, be of a different size, but lies preferably within the range between about 30° and 70°.

The closed partial face elements 7 and 7', which are shown only as cut-outs, are again in the form of chains of rhombuses 39 connected to each other at the vertices, but in this case the connecting bridges 37 are situated at the vertices with obtuse angles.

Because the partial face element 7' is moved over from the cutting line 32 in the direction of the arrow 11, rhombic openings 5 result. In this process the new connection seams 8 are produced along the mutually adjacent segments of the cutting lines. During the production of the flat structural element 4 the advance direction (arrow 40) extends parallel to the cut front 31 of the closed partial face elements 7, 7'.

In the variants illustrated in FIGS. 8 to 11 of the embodiment shown in FIG. 7, the teeth 35 have on their vertices always a short cut-off piece 34, two such cut-off pieces 34 forming a connection region. In this region may be performed soldering or welding with or without an overlap. Alternatively a mechanical fold-clamp connection may be made in this region.

When the obtained flat structural element is folded in a zigzag fashion, the folding lines may be so chosen that they extend through the connection regions between the strips of flat material, which is particulary advantageous in the case, when these strips 6 of flat material are connected to each other by fold-clamp connections, because in that case stiffening and strengthening of this special connection may be obtained by the folding edge needed for the making of the zigzag structure, this being the case particularly when, according to a special embodiment of the invention, the folding edge and the folding connection extend at an angle with respect to each other.

In FIGS. 10 and 11 is shown an asymmetrical variant; in this embodiment the provided folding edge does not extend over the connection seam 8. In the embodiments shown in FIGS. 8 and 10 hooking obtains between the teeth 35 and the gaps 36 as long as the connection seams 8 have not yet been made.

The production of cuts extending in correspondence with the cutting lines 32, 38 may be made by mechanical or non-mechanical means.

Examples of mechanical methods are:

Stamping by an oscillating stamping tool, scissor-type severing by profiled knives or contour sawing by a wire saw.

Examples of non-mechanical cutting methods are:

Water-jet cutting, laser cutting, microplasma or gas flame and also wire erosion.

Methods in which wire saws or wire erosion are used are suitable particularly in cases when several foils or metal sheets positioned one on top of the other are to be cut simultaneously.

For the making of the connections between the strips 6 of flat material may be used either mechanical methods or also welding, soldering or gluing by adhesives.

For the mechanical connections may be given the following examples:

Rivetting with or without additional material, cramping with or without additional material, snap-fastening connection or fold-clamping connections.

Advantageous welding methods include:

Microplasma welding or laser welding, resistance seam welding or resistance spot welding.

For various ones of the mentioned connection methods is necessary not to provide for the connection places or connection regions any flat overlappings.

FIGS. 12 and 13 show strip-shaped overlappings 42 and from FIGS. 14 and 15 are apparent dot-shaped overlappings 43. Correspondingly semicircular recesses 44 are provided in the starting material.

FIG. 16 shows a further variant of the production of a flat structural element according to the invention provided with rectangular openings 8 which are obtained by the use of meander-shaped cutting lines 2. As in the case of the embodiments described so far, the flat structural elements 4 are produced without any loss of material, because the strips 6 of flat material, made by specially extending cuts, are connected together displaced with respect to each other such that openings 5 are formed.

So as to produce from the obtained flat structural element 4 a three-dimensional structural element suitable particularly for use in vortex packings, the flat structural element 4 is deformed preferably in a zigzag manner according to folding lines f, as is shown by way of example in FIG. 16. The extension of the folding lines may be so selected that on the one hand optimum total structures, as regards the desired fluid and gas guidance and on the other hand stability increasing strengthening of the structural elements are obtained.

FIG. 17 shows diagrammatically a variant of a production method in which the cutting lines 32 do not extend in the transverse direction of the starting material 3 but in its longitudinal direction and consequently mutual displacement of the strips 6 of flat material may be made in the same direction as the advance direction 30 of the starting materials.

A significant advantage of the invention is that the relevant structural element may be produced in different ways which ensures adaptation to the production possibilities determined by the operation.

FIGS. 18 to 20 show further examples of flat structural elements according to the invention.

FIG. 18 shows that the cutting lines 32, while preserving a periodicity, may be selected to be so irregular, that after mutual displacement of the formed strips 6 of flat material and their new connection, openings 5 of diverse shape and size result, which may be of considerable advantage in many applications.

FIG. 19 shows a cut-out of a flat structural element which is composed of zigzag-shaped strips of flat material, the strips 6 of flat material being of different width so that over the whole area of the structural element a desired deviation from perfect regularity is achieved, as regards distribution and possibly also size of the openings 5, which gives advantageous results also in connection with crease folds.

The example according to FIG. 20 shows that the cutting line 32 may also have curved segments and in this way openings 5 are obtained which have a very special shape and may also be adapted to special conditions.

Also in the embodiment shown in FIG. 21 the strips 6 of flat material are cut without losses from a sheet-like starting material, while due to the chosen extension of the cutting lines 32 two different shapes of strips of flat material are formed, namely a relatively narrow, undulating strip of flat material and a strip of flat material which has wide and narrow portions, is always situated between two said narrow strips and which is produced by wavy extension of the cutting lines during cutting of the flat strips. By corresponding displacement and new connection of the strips of flat material are formed the openings 5 in the manner described.

FIG. 22 shows diagrammatically the principle (applicable also in different embodiments of flat structural elements) of use of flat material strips which are made three-dimensional along portions of its length. In the embodiment shown in FIG. 22 the three-dimensional deformation is obtained by the deflection of web portions in the same direction or alternately in opposite directions, but this three-dimensional deformation of portions may also be achieved by twisting of portions of the strips 6 of flat material.

FIG. 23 shows an example for the fold-clamp connection between two strips of flat material. For this purpose opposite random regions of strips of flat material are slit in a preselected connection region and the flaps formed in this way are interengaged. This clamp connection is fixed by the formation of a folding edge according to the dashed line f.

From the flat structural elements according to the above shown and explained examples may be particularly advantageously produced packings, particularly vortex packings according to the basic principle explained with reference to FIG. 1. The starting material may be metallic of made of plastics. It may have a structured surface, e.g. surface with fine grooves. In addition it may be perforated by holes whose diameter is much smaller than that of the additionally formed openings. The cutting lines themselves may be smooth or serrated.

It was found to be advantageous when making a vortex packing to provide each of the closed partial face elements, which still remain in the flat structural elements, with a further opening, while the diameter of these openings should be at least 2 mm but not more than about 4 mm.

A packing made according to the invention has various possibilities of application of which the following are mentioned by way of example:

The use in a mass exchange and/or heat exchange column between a trickle film and a gas stream, while horizontal grooving of the structural elements may be used to achieve uniform wetting.

Use in a reactor in which the packing is made as a carrier for a catalyst, or use in a static mixer for fluid media.

We claim:

1. A flat, structural element comprising a plurality of separate, adjoining strips of a sheet material, each strip having first and second, spaced-apart longitudinal edges, the longitudinal edges of adjoining strips being placed opposite each other, the adjoining strips being in contact with and secured to each other where they contact each other to provide the flat structural element with structural stability, the longitudinal edges of the strips including a plurality of repetitively spaced-apart recesses of a predetermined shape, and the recesses in longitudinal edges being opposite each other to define a multiplicity of repetitively arranged openings distributed over the structural element.

2. A flat structural element according to claim 1 wherein the recesses are regularly shaped.

3. A flat structural element according to claim 2 wherein the openings defined by recesses which are opposite each other have the shapes of rhombuses.

4. A flat structural element according to claim 1 wherein the longitudinal edges of the adjoining strips abut against each other, and wherein the abutting edges are secured to each other.

5. A flat structural element according to claim 1 wherein portions of the adjoining strips proximate the longitudinal edges overlap, and wherein overlapping portions of the adjoining strips are secured to each other.

6. A flat structural element according to claim 1 wherein the longitudinal edges are zigzag-shaped.

7. A flat structural element according to claim 6 wherein the zigzag-shaped edges are defined by angularly inclined edge portions which form vertices, and wherein portions of the strips at the vertices overlap and are secured to each other.

8. A flat structural element according to claim 1 wherein the strips have identically shaped edges and have been severed from a flat, solid sheet.

9. A flat structural element according to claim 8 wherein adjoining strips which were cut from the flat, solid sheet are offset with respect to each other in the direction of the longitudinal edges a distance sufficient to align and oppositely position the recesses of the adjoining strips to form thereby the openings in the flat structural member.

10. A method of making a flat structural element having a width, a length and a multiplicity of openings regularly distributed over the member, the method comprising the steps of providing a flat, solid sheet; making a multiplicity of single, parallel cuts along a cutting line extending from one edge of the sheet to an opposing edge thereof so that each cut generates a strip defined by two, spaced-apart longitudinal edges; shaping the cutting lines so that each longitudinal edge forms alternating protrusions and recesses distributed along the longitudinal edges; arranging the strips generally parallel to each other so that their respective longitudinal edges face each other; offsetting adjoining strips in the direction of their longitudinal edges by an amount so that the protrusions and recesses in the longitudinal edges of the adjoining strips which face each other are opposite each other; contacting the protrusions of the facing edges of the adjoining strips; and securing the contacting protrusions of the adjoining strips to each other to thereby form the flat structural member and provide it with the multiplicity of openings defined by the recesses of the longitudinal edges of the strips and distributed over the flat structural member.

11. A method according to claim 10 wherein the cutting line defines regularly spaced and shaped recesses and protrusions along the edges of the strips.

12. A method according to claim 11 wherein the step of making the cuts comprises cutting the flat, solid sheet to form identically shaped strips.

13. A method according to claim 10 wherein the step of shaping comprises shaping the cutting lines so that the protrusions and recesses have a rectangular shape.

14. A method according to claim 10 wherein the step of shaping comprises the step of shaping the cutting lines so that the protrusions and recesses have a triangular shape.

15. A method according to claim 10 wherein the step of shaping the flat, solid sheet comprises shaping the cutting lines so that the protrusions and recesses have the shape of a rhombus.

16. A method according to claim 10 wherein the step of shaping comprises shaping the cutting lines so that the protrusions and recesses are defined by curved lines.

17. A method according to claim 10 wherein the step of contacting the protrusions facing each other comprises abutting portions of the strip edges defining parts of the protrusions.

18. A method according to claim 10 wherein the step of contacting the protrusions facing each other comprises overlapping portions of the facing protrusions.

19. A method according to claim 18 wherein the step of securing the protrusions to each other comprises deforming the overlapping portions of the protrusions.

20. A method according to claim 19 wherein the step of deforming comprises the step of forming a clamping connection with the overlapping portions of the protrusions.

21. A method according to claim 10 including the step of converting the flat structural element into a packing comprising folding the flat structural element along a plurality of parallel, spaced-apart fold lines extending between opposing edges of the flat structural element.

22. A method according to claim 21 wherein the step of folding comprises folding the flat structural element along the fold lines through an angle of less than 180°.

23. A method according to claim 10 wherein the step of shaping comprises forming a plurality of openings in the flat, solid sheet and wherein the step of making a multiplicity of cuts comprises cutting the flat, solid sheet along cutting lines which intersect the openings.

24. A method according to claim 23 wherein the step of making a multiplicity of single, parallel cuts comprises cutting the flat, solid sheet along straight cutting lines which intersect the openings.

* * * * *